US008460789B1

(12) United States Patent
Gift et al.

(10) Patent No.: US 8,460,789 B1
(45) Date of Patent: Jun. 11, 2013

(54) DISPOSABLE PROTECTIVE COVER FOR A FOOT-RECEIVING SURFACE

(76) Inventors: G. Kyle Gift, Virginia Beach, VA (US); Dean Christopher Cauley, Norfolk, VA (US)

( * ) Notice: Subject to any disclaimer, the term of this patent is extended or adjusted under 35 U.S.C. 154(b) by 218 days.

(21) Appl. No.: 13/134,258

(22) Filed: Jun. 2, 2011

Related U.S. Application Data

(60) Provisional application No. 61/396,991, filed on Jun. 7, 2010.

(51) Int. Cl.
*B32B 15/04* (2006.01)
*B05D 5/10* (2006.01)

(52) U.S. Cl.
USPC .............................. 428/346; 428/43; 428/343

(58) Field of Classification Search
USPC .................................. 428/43, 346, 343, 355
See application file for complete search history.

(56) References Cited

U.S. PATENT DOCUMENTS

| 4,534,365 A | 8/1985 | Bonetta et al. |
| 6,361,079 B1 * | 3/2002 | Kirkman .......................... 283/81 |
| 6,534,729 B1 | 3/2003 | Stephens |
| 7,009,119 B2 | 3/2006 | Carlucci et al. |
| 2002/0020485 A1 * | 2/2002 | Weder et al. ................... 156/214 |
| 2010/0015420 A1 * | 1/2010 | Riebel et al. ................... 428/203 |
| 2010/0190004 A1 * | 7/2010 | Gibbins et al. ................ 428/346 |
| 2012/0015176 A1 * | 1/2012 | Riebel et al. ................... 428/323 |

* cited by examiner

*Primary Examiner* — Brent O'Hern
(74) *Attorney, Agent, or Firm* — William G. Sykes

(57) ABSTRACT

A disposable protective barrier for a foot-receiving surface of a platform scale or other similar device. The barrier is typically rectangular or square and formed from paper or a paper composite. The upper surface of the barrier may bear indicia, either decorative or functional, for example indicia indicating proper foot placement on the scale. The protective barriers may be packaged in pads using a "low-tack", reusable, pressure sensitive adhesive positioned on the lower surface of the protective barrier such that it engages a portion of the upper surface of the platform scale thereby preventing slippage of the disposable protective barrier. The paper or other material from which the barrier may be formed may also be treated with a germicide, antifungal, or some other protective substances to further protect the feet of persons placing their feet on the barrier. In other embodiments, a fragrance component may be added to the barrier.

10 Claims, 3 Drawing Sheets

DISPOSABLE PROTECTIVE COVER FOR A FOOT-RECEIVING SURFACE

RELATED APPLICATIONS

This application claims priority in accordance with 35 U.S.C. §119(e) to U.S. Provisional Patent Application No. 61/396,991 filed Jun. 7, 2010.

FIELD OF THE INVENTION

The invention pertains to sanitary protective barriers and, more particularly, to disposable protective barriers for placement on a foot-receiving surface such as a scale.

BACKGROUND OF THE INVENTION

Every day thousands of patients remove their shoes and/or socks before being weighed at a physician's office. Their bare or socked feet make contact with the surface of the scale often leaving behind foot powder, sweat, and potentially any of the many contagious foot diseases or fungal infections.

Because the feet are usually covered with socks and shoes, the skin of the foot is generally warm, dark, and moist. These three characteristics contribute to bacterial and fungal growth, often evident in the unpleasant smell of feet and the shoes covering them. While foot odor itself is not harmful, it can serve as a reminder that there are other, more aggravating foot conditions that can easily spread from person to person by fomite (i.e., inanimate objects, like scales, locker room floors, or shower stalls that are capable of transmitting infection from one person to another).

A few of the more common include dermatophytes such as Tinea and Onychomycosis that are fungal infections of the skin caused by dermatophytes, a diverse group of organisms that grow on humans as well as in soil and on animals. Transmission of dermatophytes may occur by direct person-to-person contact, by contact with animals or soil, or by contact with fomites.

Between 10% and 20% of the population worldwide is estimated to be infected with a dermatophyte. The most common clinical manifestation of dermatophyte infection is tinea pedis (also known as athlete's foot,) occurring in up to 70% of adults worldwide over a lifetime.

Not surprisingly, athlete's foot occurs commonly in athletes. A large European study revealed that 36.1% of sports-active individuals had evidence of fungal infection of the feet. Swimming pool users have been shown to have a high rate of dermatophyte infection, and marathon runners similarly have a high incidence of active and subclinical disease. Tinea pedis is the most common dermatophyte infection and is more common in males than in females. Increased incidence is related to hot humid weather and occlusive footwear is also believed to be a contributing factor.

Another common foot malady is Onychomycosis—a persistent fungal infection affecting the toenails and fingernails. Onychomycosis is most commonly found in people between the ages of 40 and 60 years. A typical reported incidence is between approximately 20 and 100 cases/1000 population. Toenail infection is typically four to six times more common than fingernail infection. Onychomycosis occurs more frequently in patients with common chronic medical problems such as diabetes and peripheral vascular disease, and in patients with any other conditions resulting in suppression of the immune system.

Still another condition is human papillomavirus (HPV) more commonly called warts. Warts are skin growths caused by human papillomavirus (HPV). The often painful plantar wart (verruca plantaris, on the bottom of the foot) and common wart (verruca vulgaris, on other skin surfaces) are the usual non-genital presentations. The principal sites are typically on the hands and feet, and they are a major cause of dermatological consultation. The HPV virus typically enters the body through skin abrasions. Transmission is believed to be by direct contact or by fomites. HPV infections of the skin are common, and most individuals are probably infected with one or more HPV types at some time.

Still another condition is arcoptes scabiei, better known as scabies. Human scabies is a highly contagious disease caused by the parasitic mite Sarcoptes scabiei. Fomite transmission is believed to be a major factor in passage of scabies.

Lesions of scabies are typically found in the finger webs, wrists, extensor surfaces of the elbows and knees, ankles, sides of the hands and feet, axillary areas, buttocks, and waist area.

Finally, Coxsackie virus (hand-foot-mouth disease or HFM) is a viral illness caused by Coxsackie viruses. HFM is characterized by lesions of the extremities (especially the feet and hands) and of the mucus membranes, especially the mouth. HFM is highly contagious and transmitted primarily by the fecal-oral route, but can also be isolated in the fluid from skin blisters. Although children are predominantly affected, adults are also at risk.

While physicians, nurses, other heath care professionals, and even patients typically wash and often disinfect their hands many times throughout the day to prevent the spread of germs and contaminants, little attention is often paid to the feet.

Patients are routinely weighed, ambulatory patients typically being weighted on a so-called platform scale. Such scales have a horizontal platform upon which the person being weighed is instructed to stand, typically without his or her shoes. The last patient of the day is instructed to make contact with an unprotected surface that every previous patient has contacted. This provides an opportunity for the spread of foot borne disease or other contamination.

Infants are typically weighed in a "cradle style" scale that is lined with disposable paper or other barrier designed to prevent the spread of germs. Also, each medical examination table is typically covered with paper or a similar barrier to also provide a sanitary surface for each new patient thereby also preventing the spread of germs or other contaminants.

It would, therefore, be desirable to provide a similar barrier for use with platform scales or other foot-receiving surfaces to likewise prevent the spread of germs or other contamination.

DISCUSSION OF THE RELATED ART

U.S. Pat. No. 4,534,365 for APPARATUS FOR EVALUATING FOOT CONDITION, issued Aug. 13, 1985 to Angelo A. Bonetta et al. discloses a sheet of paper that may be drawn across a foot receiving surface of a thermographic imaging apparatus.

U.S. Pat. No. 6,534,729 for WEIGHING SCALE WITH SCALE PAN AND BODY MADE FROM A PARTICULATE OF NATURAL STONE, issued Mar. 18, 2003 to Brian Stephens asserts that natural stone provides a hygienic surface to accommodate the bare feet of subjects being weighed thereupon.

U.S. Pat. No. 7,009,119 for WEIGHT SCALE CONTROL SYSTEM AND PAD, issued Mar. 7, 2006 to Vito James Carlucci et al. teaches a scale having a viscoelastic foam pad which may have hypoallergenic, antibacterial, and anti-fungal properties.

None of the patents, taken singly, or in any combination are seen to teach or suggest the novel disposable protective barrier for a foot receiving surface of the present invention.

SUMMARY OF THE INVENTION

In accordance with the present invention there is provided a disposable barrier for a foot-receiving surface of a platform scale or other similar device. The novel barrier is typically rectangular or square and formed from paper or a similar material.

The upper surface of the barrier may bear indicia, either decorative or functional. For example, the accuracy of a weight measurement may sometimes be affected by the position of a person being weighed on the scale platform. By placing, for example, indicia indicating proper foot placement on the upper surface of the barrier, such problems may be minimized.

Other examples of functional indicia might include a variation of a message such as: any variation of a message or instruction that would lead a patient to understand that they are to use the novel protective barrier if they plan to remove their shoes before being weighed.

The barrier may be individually distributed to each person to be weighed manually by a nurse, technician, receptionist, etc. Alternately, the protective barriers may be dispensed using any known traditional dispensing mechanisms designed for thin sheets of the required size.

In still other embodiments, the protective barriers may be stacked into pads in a manner similar to the ubiquitous "Post-It®" notes that utilize a "low-tack", reusable, pressure sensitive adhesive to temporarily adhere a note to another document or other surface. The low-tack adhesive may be positioned on the lower surface of the protective barrier such that it engages a portion of the upper surface of the platform scale thereby preventing slippage of the protective barrier thereupon. Such a feature may be useful in helping prevent the protective barrier from skidding from under a person who is stepping on to or off of a platform scale, thereby helping to prevent a fall.

The paper or other material from which the barrier may be formed may also be treated with a germicide, antifungal, or some other protective substances to further protect the feet of persons utilizing the barrier. In other embodiments, a fragrance component may be added to the barrier.

It is, therefore, an object of the invention to provide a disposable, thin protective barrier for placement between the feet of a person to be weighed and the upper surface of a platform or similar scale.

It is another object of the invention to provide a disposable, thin protective barrier wherein the barrier is formed from paper or a paper-like substance.

It is an additional object of the invention to provide a disposable, thin protective barrier wherein the barrier carries indicia on an upper surface thereof.

It is a further object of the invention to provide a disposable, thin protective barrier that may be aggregated in a package from which individual barriers may readily be withdrawn near a point of use (e.g., a scale).

It is a still further object of the invention to provide a disposable, thin protective barrier having a region of low-tack adhesive on at least a portion of a lower surface.

It is yet another object of the invention to provide a disposable, thin protective barrier wherein the barrier is treated with a germicide, antifungal or other protective substance.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

The present invention provides thin, sanitary, disposable, single use protective barriers for use on the upper surface of a platform or similar scale adapted to receive the feet of a person to be weighed thereupon. While a platform scale has been chosen for purposes of disclosure, it will be recognized that the novel barrier may be used with a different type of scale or with any other apparatus or environment where bare feet of a human need to be protected from contamination present on a horizontal, foot-receiving surface.

Figure 1:
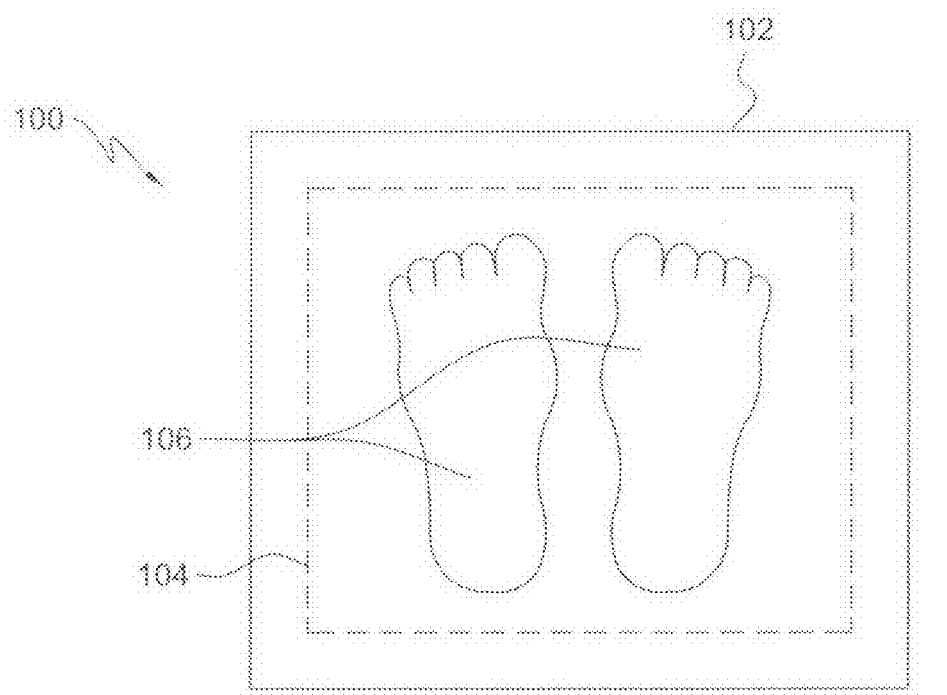
FIG. 1 is a top plan view of a barrier in accordance with the invention.

Referring first to FIG. 1, there is shown a top plan view of first embodiment of a barrier in accordance with the invention, generally at reference number 100. Barrier 100 consists of substrate 102 formed from a thin, flexible material, typically paper or a paper composite. Protective barrier material is widely used for providing a fresh, clean surface on examination tables or similar devices in medical facilities. Such examination table papers are typically supplied in rolls and may consist of a single ply of wood pulp paper laminated with a single ply of polyethylene (PE) film. Other well known configurations include two wood pulp paper layers with a single PE ply, and/or two wood pulp plies laminated together.

Various grades of wood pulp paper may be used to make such barrier papers of different overall qualities. Also, several surface finishes are commonly available. In addition, examination table papers having varying degrees of brightness, with or without decorative patterns printed thereupon are also available.

It will be recognized that a substrate 102 may utilize any suitable combination of plies, the critical operative requirement being that substrate 102 withstand the weight of a person standing thereupon.

Figure 5:
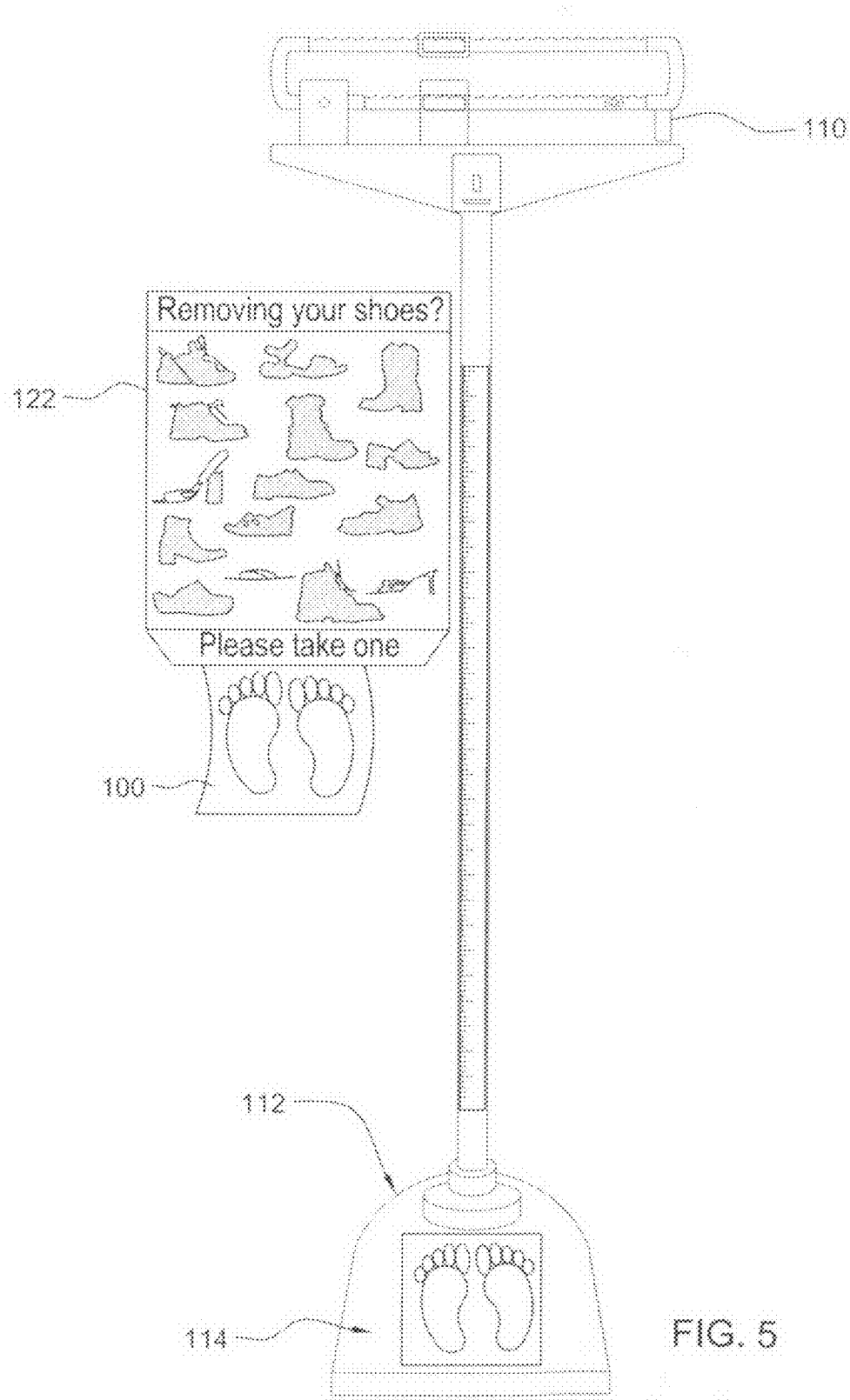
FIG. 5 is a pictorial, schematic view of a typical platform scale in a typical operating environment with the barrier of FIG. 1 installed thereupon.

Referring now also to FIG. 5, there is shown a pictorial, schematic view of a typical platform scale 110 in a typical operating environment with the barrier 100 of FIG. 1 installed thereupon. Substrate 102 is typically sized to be approximately the same size as a foot-receiving surface 112 of scale platform 114 it is intended to cover. Typical scale platforms 114 of common medical scales 110 are approximately 14 inches×16.5 inches. Consequently, substrate 102 is typically sized approximately the same. Smaller sizes of substrate 102 may be provided if desired but such smaller sizes be large enough to accommodate the entire bottom surfaces, not shown, of the feet of a person, not shown, standing thereupon.

Indicia 104 is disposed on an upper surface of substrate 102. In the example chosen for purposes of disclosure, a pair of side-by-side foot prints 106 are printed or otherwise applied to the upper surface of substrate 102. Side-by-side footprints 106 indicate the ideal placement for the feet of a person standing upon the scale 110 to be weighed. Proper foot placement on platform 114 of scale 110 is important to ensure an accurate weight measurement. Indicia 104 helps ensure proper foot placement.

It will be recognized that indicia 104 may consist of any meaningful information and may include such information as a logo associated with the facility where the scale 100 is located, advertising, or other such material. As indicia 104 may comprise any combination of graphic or textual material, the invention is not considered limited to any particular indicia 104.

While indicia 104 is typically printed on upper surface of substrate 102 using printing techniques believed to be well known to those of skill in the art, it will be recognized that techniques other than printing may be used to add all or a portion of indicia 104 to the upper surface of substrate 102. For example, silk screening, embossing, stickers or other appliqués may be added to the upper surface of substrate 102 in addition to or in place of printed indicia.

Figure 2:
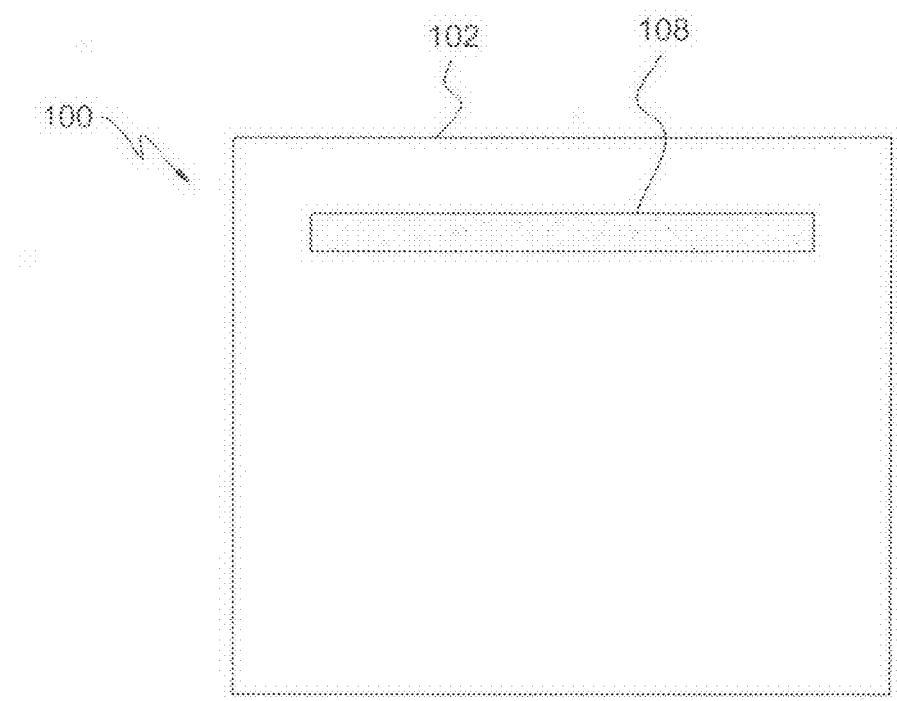
FIG. 2 is a bottom plan view of the barrier of FIG. 1.

Referring now to FIG. 2, there is shown a bottom plan view of barrier 100. A patch or strip of low-tack adhesive 108 is disposed on a portion of a lower surface of substrate 102. Low tack adhesives 108 are believed to be well known to those of skill in the adhesive arts and, consequently, are not further discussed herein. A reusable adhesive similar to that used to adhere Post-It® notes to one another and to external surfaces is believed suitable for the application. In addition to being a low-tack adhesive, it is desirable that adhesive 108 be a low residue adhesive to avoid adhesive buildup on foot-receiving surface 112 of platform scale 110.

Figure 3:
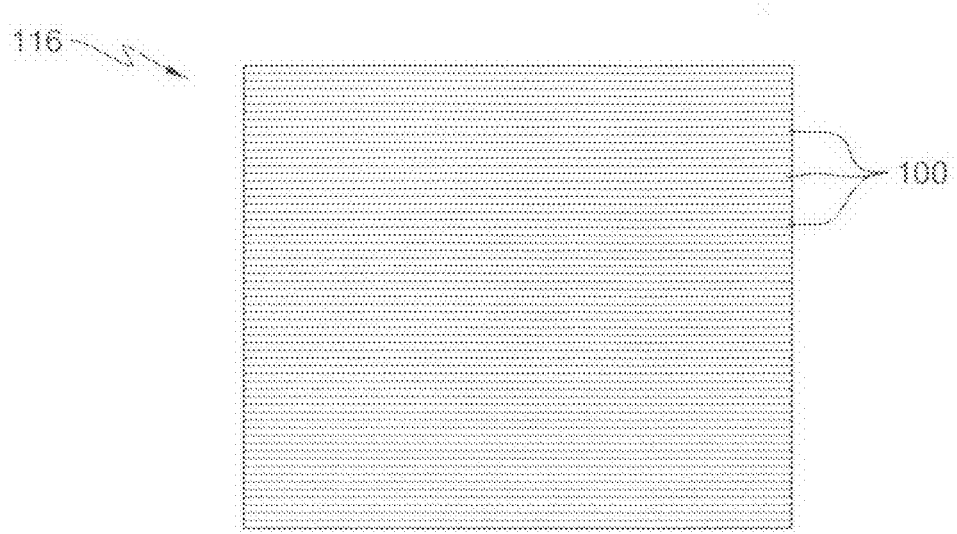
FIG. 3 is a side elevational view of several barriers of FIG. 1 in a padded configuration.

Referring now also to FIG. 3, there is shown a side elevational schematic view of a plurality of barriers 100 aligned with and disposed one upon another in a stack 116. Stack 116 is a padded configuration wherein barriers 100 are adhered to one another primarily by low-tack adhesive 108. In use, a single barrier 100 may readily be separated from stack 116 for use.

Figure 4:
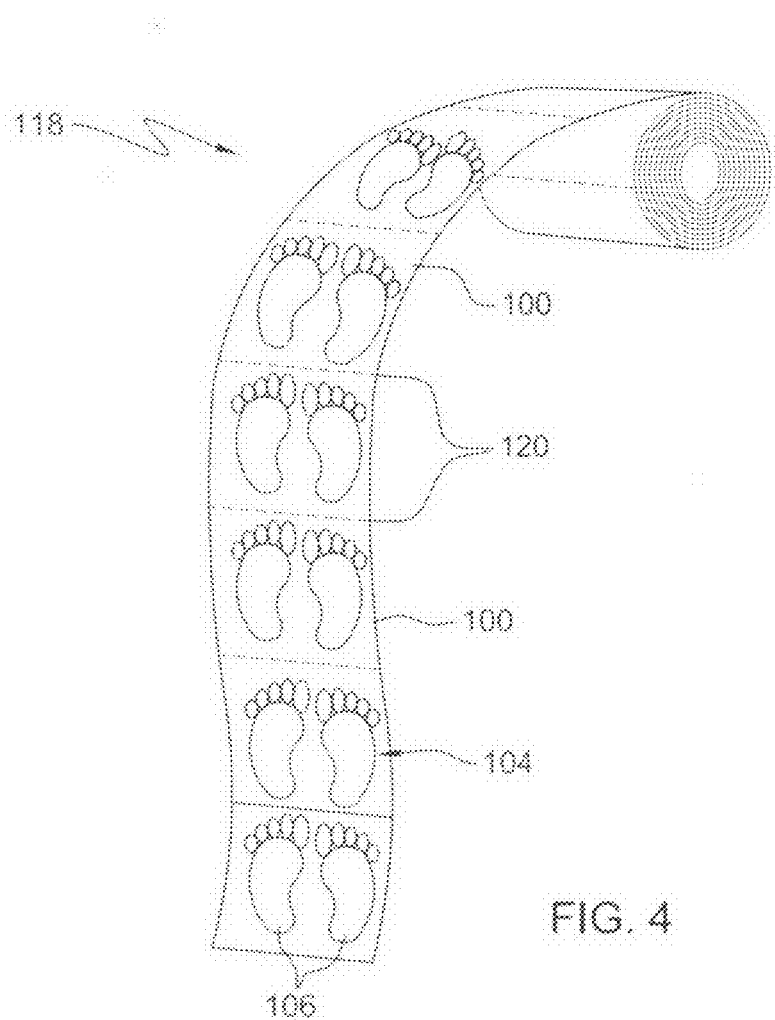
FIG. 4 is a top plan view of an alternate embodiment of the barrier in accordance with the invention.

Referring now also to FIG. 4, there is shown an alternate embodiment of barrier 100, generally at reference number 118. In this alternate embodiment, barrier 100 may be supplied in a continuous roll 118 consisting of individual barriers 100 separated from one another by a perforation 120. An individual barrier 100 may be removed from roll 116 by tearing or otherwise separating the individual barrier 100 from roll 116.

Referring now also to FIG. 5, there is shown a front perspective, pictorial view of a typical platform scale, generally at reference number 110. Scale 110 is typical of scales used in doctor's offices, clinics, gyms or other athletic facilities, fitness centers, weight loss meeting rooms, etc. Scale 110 forms no part of the present invention but is shown to illustrate barrier 100 in one of the intended operating environments thereof.

Platform scale 110 has a foot-receiving portion (i.e., platform) 114 having a foot-receiving surface 112 adapted to receive the feet of a person, not shown, to be weighed. It is onto foot-receiving surface 112 that a person to be weighed is typically asked to place his or her feet, often after removing his/her shoes. A typical platform scale 110 for use in weighing human subjects has a platform size in the range of approximately 14 inches×16.5 inches.

A dispenser 122, shown schematically at reference number 122, located adjacent scale 110 may be used to dispense barriers 100 for use therewith. Such dispensers and method of packaging items such as barrier 100 are believed to be well know to those of skill in the art. Consequently such dispensers and/or packaging methods are not further discussed herein.

Substrate 102 of barrier 100 may have an antimicrobial substance embedded within one of its plies or coated on an upper surface thereof. Antimicrobial substances that effectively combat microorganisms such as mold, fungus, mildew and odor causing bacteria are believed to be known to those of skill in the art and, consequently, are not further discussed herein.

Another possible treatment of substrate 102 is to include a fragrance component either impregnated within one of the plies or as a surface treatment. Such fragrance components and techniques for impregnating or coating a substrate are also believe to be well known to those of skill in the art.

While an application for use with platform scale 110 has been used for purposes of disclosure, it will be recognized that disposable protective barrier 100 may be used for numerous other applications. Barrier 100 is suitable for use anywhere that a person is required to place his or her feet onto a potentially contaminated surface. Such situations are found in locker rooms, dressing rooms, or other public areas where a person may need to remove at least his or her shoes.

Shoe stores or shoe departments of department stores provide another potential application for barrier 100. For such an application, indicia 104 may include a shoe size template printed whereupon a person may place his or her feet on the template to make a rough determination of a required shoe size.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A protective barrier for a foot-receiving surface, comprising:
   a) a flexible substrate sized and configured to cover at least a portion of a foot-receiving surface, said substrate having an upper surface and an opposing lower surface;
   b) a pair of footprints disposed on said upper surface of said substrate; and
   c) an adhesive disposed on at least a portion of said lower surface of said substrate
   d) an antimicrobial substance effective against at least one microorganism selected from the group: mold, fungi, mildew, and odor-causing bacteria applied to said substrate in at least one way selected from the group: embedded within said substrate, and coated on a surface of said substrate.

2. The protective barrier for a foot-receiving surface as recited in claim 1, wherein said substrate comprises a multi-layer substrate.

3. The protective barrier for a foot-receiving surface as recited in claim 2, wherein said multi-layer substrate comprises at least two layers selected from the group: paper, polyethylene, and a coating applied to at least one surface of at least one of said multiple layers.

4. The protective barrier for a foot-receiving surface as recited in claim 1, wherein said foot-receiving surface forms a foot receiving portion of a platform scale, said foot receiving portion having at least a width and a length and wherein said substrate has a width and a length substantially equal to said width and said length of said foot-receiving portion of said platform scale.

5. The protective barrier for a foot-receiving surface as recited in claim 1 further comprising:
   e) a fragrance component applied to said substrate in at least one way selected from the group: embedded within said substrate, and coated on a surface of said substrate.

6. The protective barrier for a foot-receiving surface as recited in claim 1, wherein said substrate is formed as an elongated strip of individual substrates, each of said individual substrates separated from one another by a perforation disposed perpendicularly to a major axis of said continuous strip.

7. The protective barrier for a foot-receiving surface as recited in claim 6, wherein of said individual substrates comprises a multi-layer substrate.

8. The protective barrier for a foot-receiving surface as recited in claim 7, wherein each of said multi-layer individual substrates comprises at least two layers selected from the group: paper, polyethylene, and a coating applied to at least one surface of at least one of said multiple layers.

9. The protective barrier for a foot-receiving surface as recited in claim 6, wherein said foot-receiving surface forms a foot receiving portion of a platform scale, said foot receiving portion having at least a width and a length and wherein each of said individual substrates has a width and a length substantially equal to said width and said length of said foot-receiving portion of said platform scale.

10. The protective barrier for a foot-receiving surface as recited in claim 6 further comprising:
   e) a fragrance component applied to said substrate in at least one way selected from the group: embedded within said substrate; and coated on a surface of said substrate.

* * * * *